2,814,647
Patented Nov. 26, 1957

2,814,647
ALKYL 4,4,4-TRICHLORO-3-HYDROXY-ORTHO-BUTYRATES AND METHOD OF PREPARING SAME

Donald G. Kundiger and John H. Hennes, Manhattan, Kans., assignors to The Dow Chemical Company, Midland, Mich., a corporation of Delaware No Drawing. Application November 3, 1955, Serial No. 544,808

4 Claims. (Cl. 260—615)

This invention is directed to novel alkyl 4,4,4-trichloro-3-hydroxy-orthobutyrates, having the formula

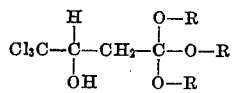

wherein each R is an alkyl radical containing from 1 to 4 carbon atoms, inclusive, and a method of preparing said compounds. The new compounds are crystalline solids, soluble in many organic solvents and of low solubility in water. The compounds of the invention are useful as intermediates for the production of other organic compounds and as active antimicrobial toxicants for the control of bacteria and fungi.

The alkyl 4,4,4-trichloro-3-hydroxy-orthobutyrates are prepared by reacting anhydrous chloral with an alkyl orthoacetate of the formula

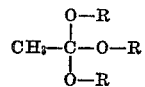

wherein each R represents an alkyl radical as set forth above. The reaction is initiated readily when the chloral and alkyl orthoacetate are contacted at temperatures of from about 0° C. to about 100° C., or a little higher, and under ordinary pressures. In such operations, the undiluted chloral and orthoacetate reactants may be mixed together to initiate the reaction or the reaction may be carried out in a suitable inert solvent such as toluene, xylene, petroleum ether, naphtha, or a chlorinated hydrocarbon solvent.

In carrying out the reaction, some of the desired alkyl trichloro-hydroxy-orthobutyrate product is produced under the described reaction conditions regardless of the proportions of chloral and alkyl orthoacetate present in the reaction mixture. However, in order to obtain maximum yields, it is preferred to employ substantially equimolar proportions of the chloral and alkyl orthoacetate reactants.

The desired reaction product may be separated from the reaction mixture by conventional procedures such as fractional distillation, extraction and crystallization.

The reaction is somewhat exothermic and proceeds rapidly with increasing temperature. In general, the reaction is complete in about 30 minutes at temperatures of about 100° C. while somewhat longer reaction times of up to several hours are required in the lower portions of the reaction temperature range. Excessive temperatures are to be avoided since such temperatures lead to decomposition of the desired product and the formation of undesired by-products.

The alkyl orthoacetates can be prepared by reacting the appropriate anhydrous alcohols with an alkyl iminoacetate as set forth, for example, by Sah, Journal of the American Chemical Society, vol. 50, p. 516 (1928).

In a representative operation, 69.7 grams (0.43 mole) of triethyl-orthoacetate was dissolved in hexane at a temperature of about 5° C. To the resulting solution, 63.4 grams (0.43 mole) of anhydrous chloral was added portionwise with stirring and the reaction mixture maintained at temperatures of 5° to 10° C. for a period of 2.5 hours by cooling with an ice bath. At the end of this period the ice bath was removed and the temperature of the reaction mixture rose by heat of reaction to 42° C., with the reaction continuing at this temperature for a period of 30 minutes. Thereafter, the reaction mixture was cooled to 5° C. to accomplish crystallization of the triethyl 4,4,4-trichloro-3-hydroxy-orthobutyrate product. The latter, after separation by filtration and drying, was found to have a melting point of 89°–91° C. Recrystallization from hexane gave a purified crystalline product melting at 91°–92° C. and analyzing 38.88 percent carbon, 6.23 percent hydrogen and 34.43 percent chlorine by weight.

In a further operation equimolar proportions of anhydrous chloral and triethyl orthoacetate were mixed together at room temperature. Reaction, as evidenced by evolution of heat, was rapidly initiated and the temperature of the reaction mixture rose to about 100° C. On completion of the reaction the triethyl 4,4,4-trichloro-3-hydroxy-orthobutyrate product was separated by cooling, crystallization and filtration as set forth above.

In a similar fashion, anhydrous chloral is reacted with trimethyl orthoacetate to produce trimethyl 4,4,4-trichloro-3-hydroxy-orthobutyrate, with ethyl-dipropyl orthoacetate to produce ethyl-dipropyl 4,4,4-trichloro-3-hydroxy-orthobutyrate and with ethyl-dibutyl orthoacetate to produce ethyl-dibutyl 4,4,4-trichloro-3-hydroxy-orthobutyrate.

Triethyl 4,4,4-trichloro-3-hydroxy-orthobutyrate, when dispersed at a concentration of 1 percent by weight in nutrient agar media suitable for supporting the growth of the respective test organisms, gave 100 percent control of the growth of *Staphylococcus aureus*, *Salmonella typhosa* and *Rhizopus nigricans*.

We claim:

1. Alkyl 4,4,4-trichloro-3-hydroxy-orthobutyrates having the formula

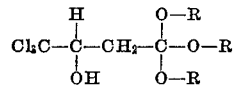

wherein each R represents an alkyl radical containing from 1 to 4 carbon atoms, inclusive.

2. Triethyl 4,4,4-trichloro-3-hydroxy-orthobutyrate.

3. A method for the preparation of alkyl 4,4,4-trichloro-3-hydroxy-orthobutyrates having the formula

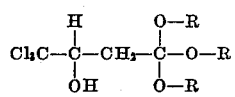

wherein each R represents an alkyl radical containing from 1 to 4 carbon atoms, inclusive, which comprises contacting an alkyl-orthoacetate of the formula

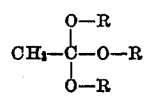

wherein each R has the above significance, with anhydrous chloral at a temperature of from about 0° C. to about 100° C.

4. A method according to claim 3 wherein the chloral and alkyl-orthoacetate are employed in substantially equimolar proportions.

References Cited in the file of this patent

Post, Howard W.: Journal Org. Chem., vol. 6, 1941, pgs. 830–834.